May 12, 1936.  L. A. SUMMERS  2,040,716
MOTOR VEHICLE ENGINE CONTROL
Filed June 7, 1935   2 Sheets-Sheet 2
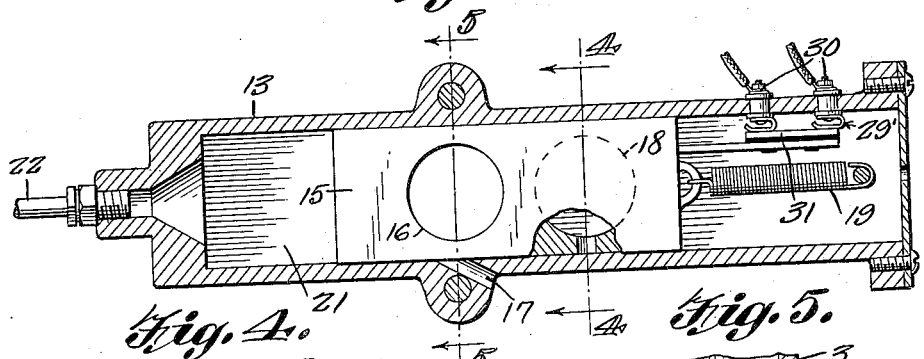
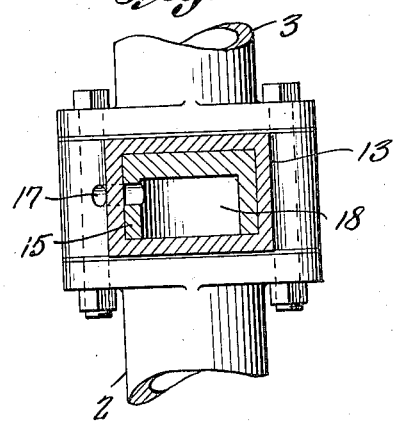
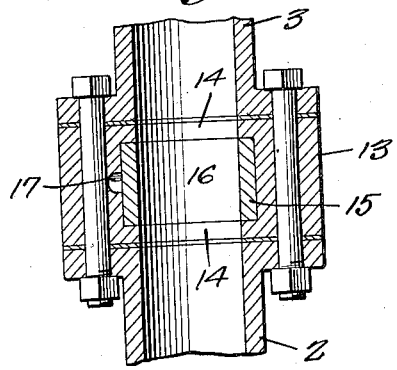
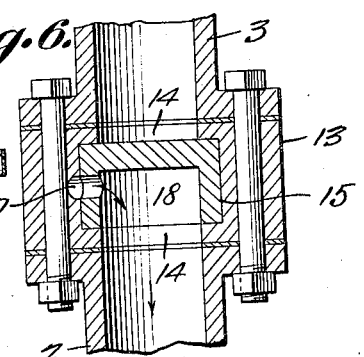
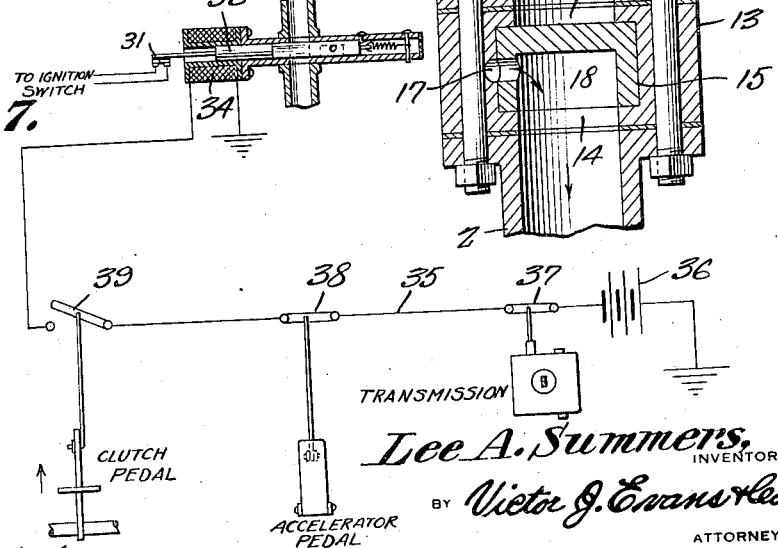
Lee A. Summers, INVENTOR
BY Victor J. Evans & Co.
ATTORNEY Patented May 12, 1936

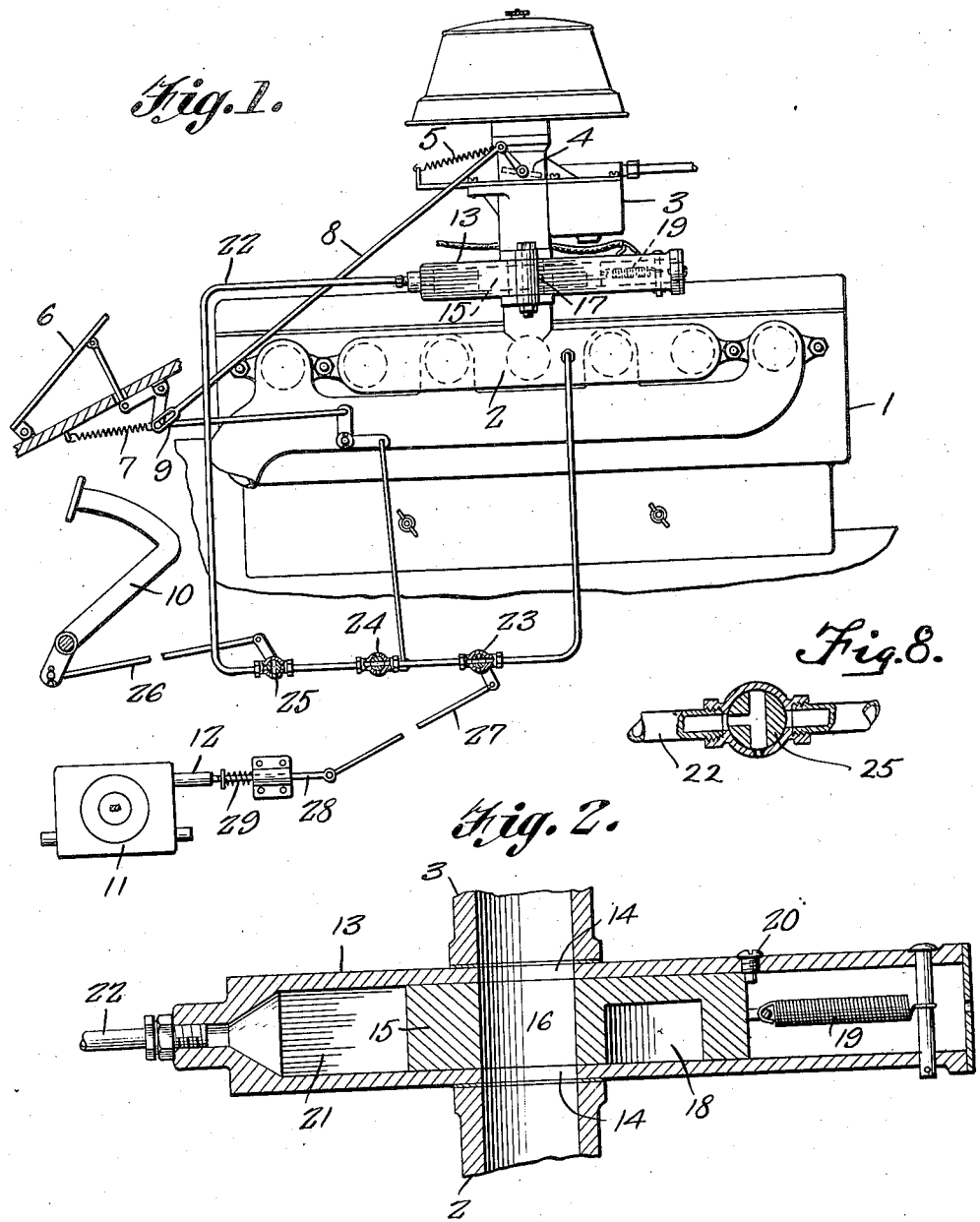

2,040,716

UNITED STATES PATENT OFFICE 2,040,716

MOTOR VEHICLE ENGINE CONTROL

Lee Albert Summers, Washington, D. C.

Application June 7, 1935, Serial No. 25,525

9 Claims. (Cl. 192—.01)

This invention relates to a motor vehicle engine control and more particularly to a device for operating in conjunction with the conventional controls of the motor vehicle which consists of the usual accelerator, clutch pedal and the transmission high gear and has for the primary object the provision of a device of this character which will in no way change the present method of driving the motor vehicle and which will automatically cut off the entire flow of fuel to the engine and simultaneously turn off the ignition when the motor vehicle is traveling under its momentum with the accelerator positioned to admit only sufficient fuel for the running of the engine at idling speed so that the engine will lack fuel and permit the full compression of the engine to be had for slowing down of the motor vehicle and for aiding in cooling the engine and the device automatically turns on the ignition and restores fuel to the engine for idling of the latter when the clutch of the vehicle is disengaged or the transmission is in neutral or any gear except high gear, whereby the motor vehicle may be brought to a full stop with the engine idling.

With these and other objects in view, this invention consists in certain novel features of construction, combination and arrangement of parts to be hereinafter more fully described and claimed.

For a complete understanding of my invention, reference is to be had to the following description and accompanying drawings, in which Figure 1 is a side elevation, partly in section, showing the motor vehicle engine and conventional controls therefor and illustrating my invention adapted thereto with the clutch pedal shown in a depressed position and the accelerator in an off position or a position for admitting sufficient fuel to the engine for idling purposes.

Figure 2 is a fragmentary sectional view showing a self-closing valve opened by suction and forming a part of my invention, being located between the carbureter and the intake manifold of the engine.

Figure 3 is a fragmentary sectional view showing the valve and the circuit breaker of the ignition system associated therewith.

Figure 4 is a transverse sectional view taken on the line 4—4 of Figure 3.

Figure 5 is a transverse sectional view taken on the line 5—5 of Figure 3.

Figure 6 is a fragmentary sectional view showing the valve positioned for admitting air from the atmosphere to the intake manifold.

Figure 7 is a diagrammatical view showing the valve of my invention electrically actuated.

Figure 8 is a detail sectional view showing one of the control valves of the device.

Referring in detail to the drawings, the numeral 1 indicates a fragmentary portion of an engine of a motor vehicle having an intake manifold 2 and a carbureter 3 provided with a control valve 4 urged into engine idling speed by a spring 5. The control valve is actuated by an accelerator 6 and the latter is urged into valve-closing position by a spring 7. The link 8 which connects the valve 4 to the accelerator 6 includes in its construction a pin and slot connection 9 which will permit the accelerator 6 to have a limited movement prior to urging the valve 4 towards open position.

The character 10 indicates a clutch pedal of the motor vehicle to which the engine 1 is installed and the clutch pedal is shown in a depressed position in Figure 1 for the purpose of disengaging the clutch.

The character 11 indicates the conventional type of transmission employed in the motor vehicle with a part of the high gear mechanism shown at 12. The foregoing briefly sets forth a motor vehicle construction and to which my invention is adapted.

A valve housing 13 is mounted between the carbureter 3 and the intake manifold 2 and is provided with oppositely arranged ports 14 communicative with the carbureter and the intake manifold. A valve element 15 is slidably mounted in the housing 13 and has a port 16 which when aligned with the ports 14 permits fuel to pass from the carbureter to the intake manifold. The valve housing is provided with a vent opening 17 open to the atmosphere and which is closed to the interior of the housing by the valve element 15 when the latter is positioned to align the port 16 thereof with the ports 14 of the valve housing. A chamber 18 is formed in the valve element and is normally out of communication with the vent opening 17 but may be positioned to communicate with said vent opening and with the intake manifold so that the engine may draw air into its cylinders directly from the atmosphere when the valve element is positioned to bring the port 16 out of registration with the ports 14 which interrupts or cuts off flow of fuel from the carbureter to the engine. A spring 19 is connected to the valve element and to the housing and acts to position the valve element so that the port 16 thereof aligns with the ports 14. The valve element is limited in its movement under the action of the spring 19 by a stop 20. The valve element snugly fits the walls of the housing and forms between one end thereof and one end of the housing a suction chamber 21 having connected thereto a pipe 22 which is in turn connected to the intake manifold. Located in the pipe are valves 23, 24, and 25. The valve 25 is connected to the clutch pedal by a link 26. A link 27 is connected to the valve 23 and to a slidably mounted pin 28 located adjacent to the transmission 11. The pin 28 is spring-pressed, as shown at 29, to position said pin in the path of movement of the high gear medium 12 of the transmission so that when said transmission is in high gear the valve 23 is positioned to open the pipe 22. The accelerator 6 when in position to cause idling speed to the engine positions the valve 24 to open the pipe 22 and as the accelerator is depressed to move the valve 4 towards an open position for increasing the speed of the engine over idling speed, the initial movement of the accelerator in the stated direction brings about closing of the valve 24. The clutch pedal when positioned to engage the clutch opens the valve 25 and when positioned to disengage the clutch closes the valve 25.

My invention equipped to an automobile as heretofore described, will in no way change the customary manner of driving by the operator, the speed of the engine being increased by depressing the accelerator and the slowing down of the engine being brought about by the elevation of the accelerator. It is to be understood that when the accelerator is in full elevated position, the carbureter valve 4 admits a limited amount of fuel to the engine sufficient to maintain the engine running at idling speed. This is common in all motor vehicle construction.

The valves 23, 24, and 25 when in position to close the chamber 21 to the intake manifold will open said chamber to the atmosphere. These valves are of the three-way type and valve 25 is shown in detail in Figure 8. The valves 23 and 24 are of the same construction as the valve 25.

The operation of my invention in connection with a motor vehicle will be as follows:

First, when the engine is running at idling speed and with either the clutch disengaged or the transmission in neutral, the pipe 22 will be closed preventing the suction in the manifold from acting on the valve element 15, the spring 19 maintaining the valve to align the ports 14 and 16 so that fuel from the carbureter may pass to the engine for sustaining operation of the engine at idling speed. The transmission being placed in either low, second or reverse gear will have no effect on the present invention so that the changing of gears in the starting of the vehicle may be as usual. However, when the transmission is in high gear the valve 23 is open. When the clutch is engaged for connecting the transmission to the engine, the valve 25 is open. The accelerator when at idling speed opens the valve 24 and closes said valve 24 on its initial movement to open the carbureter valve 4 so that as long as the engine is acting to propel the vehicle suction from the intake manifold is interrupted to the suction chamber 21. However, when the motor vehicle descends a grade and the accelerator is allowed to elevate into a position for obtaining idling speed to the engine, the valve 24 is opened and as the valves 23 and 25 are opened the suction in the manifold acts on the valve element 15 to bring the chamber 18 in communication with the vent and the intake manifold cutting off the entire supply of fuel from the carbureter to the engine so that the full compression of the engine may be utilized for slowing down the vehicle. As the valve moves into said position by the suction of the engine it automatically breaks the ignition circuit through the operation of a switch 29'. Thus it will be seen that during the slowing down of the vehicle by the compression of the engine fuel will be conserved as well as electrical energy of the electrical source. As the engine is now operating under the influence of the momentum of the vehicle with no explosion therein said engine will more rapidly cool. It is customary in driving a motor vehicle to disengage a clutch just before the motor vehicle stops and the disengagement of the clutch closes the valve 25, thus cutting off the suction in the intake manifold to the chamber 21 permitting the spring 19 to restore the valve 15 to its initial position, thereby establishing communication between the carbureter and the intake manifold so that fuel may be drawn into the engine to maintain the engine operating at idling speed. If the automobile is to remain standing for a length of time it is customary to place the transmission in neutral and so doing permits the spring 29 of the pin 28 to act and slide said pin for bringing about closing of the valve 23. The clutch may then be engaged as usual. However, the suction of the intake manifold of the engine will be prevented from acting on the valve 15 by the valve 23.

From the foregoing description and accompanying drawings it will be seen that the shifting of the valve 15 in a position to cut off the fuel to the engine only takes place when the vehicle is traveling under its momentum with the accelerator released or positioned to close the valve 4 of the carbureter.

The switch 29' includes contacts 30 carried by the housing and electrically connected in the ignition circuit and are bridged by a movable contact 31 secured to the valve element 15 when the latter is in its normal position or the position of establishing communication of the carbureter to the intake manifold.

While I have described the operation of the valve element 15 through the suction of the engine and mechanical construction connected with the accelerator, clutch pedal and transmission, the valve element may be electrically actuated as suggested or shown in Figure 7. In this figure a portion of the valve element is in the form of a core 33 and to which is connected the movable contact 31 of the switch 29'. The core 33 operates in a solenoid 34 and the latter is electrically connected in an electric circuit 35 having an electrical source 36. Switches 37, 38, and 39 are arranged in the circuit 35 and the switch 37 is operatively connected to the pin 28 of the transmission while the switch 38 is operatively connected to the accelerator and the switch 39 is operatively connected to the clutch pedal. The solenoid when energized acts on the core 33 to position the valve element 15 so as to interrupt the flow of fuel to the engine from the carbureter. The deenergization of the solenoid 34 permits the spring 19 to restore the valve element 15 to its initial position and thereby restore communication between the carbureter and the intake manifold. The interruption or breaking of the circuit 35 may be caused either by the disengagement of the clutch, the accelerator moving into position for closing the carbureter valve 4 or the transmission assuming neutral position or any of its variable speed positions except high gear, the switch 37 remaining in circuit closing position at this time.

Having described the invention, I claim:

1. The combination of a control for location in a feed of a carbureter to an internal combustion engine of a motor vehicle for normally opening said feed to the engine and adapted to establish communication of the atmosphere with said feed when the latter is shut off by said control, means automatically operating said control for actuating the same from normal feeding position, and means operated by an accelerator, clutch and a medium of a transmission for regulating said first means.

2. The combination of a control for location in a feed of a carbureter to an internal combustion engine of a motor vehicle for normally opening said feed to the engine and adapted to establish communication of the atmosphere with said feed when the latter is shut off by said control, means automatically operating said control for actuating the same from normal feeding position, means operated by an accelerator, clutch and a medium of a transmission for regulating said first means, and means coacting with said control for controlling the ignition of the engine.

3. The combination of a control for location in a feed of a carbureter to an internal combustion engine of a motor vehicle for normally opening said feed to the engine and adapted to establish communication of the atmosphere with said feed when the latter is shut off by said control, means automatically operating said control for actuating the same from normal feeding position, means operated by an accelerator, clutch and a medium of a transmission for regulating said first means, means coacting with said control for controlling the ignition of the engine, and a tension element connected to said control for urging the latter into feeding position.

4. The combination of a control for location in a feed of a carbureter to an internal combustion engine of a motor vehicle for normally opening said feed to the engine and adapted to establish communication of the atmosphere with said feed when the latter is shut off by said control, means automatically operating said control for actuating the same from normal feeding position, means operated by an accelerator, clutch and a medium of a transmission for regulating said first means, means coacting with said control for controlling the ignition of the engine, a tension element connected to said control for urging the latter into feeding position, and opening and closing valves included in said second named means.

5. The combination of a valve for location in a feed of a carbureter to an internal combustion engine of a motor vehicle for normally opening said feed to the engine and adapted to establish communication of the atmosphere with said feed when the latter is shut off by said valve, means automatically operating said valve for actuating the same from normal feeding position, means operated by an accelerator, clutch and a medium of a transmission for regulating said first means, means coacting with said valve for controlling the ignition of the engine, a tension element connected to said valve for urging the latter into feeding position, opening and closing valves included in said second-named means, and a housing included in said feed and having the first valve slidable therein.

6. The combination of a valve for location in a feed of a carbureter to an internal combustion engine of a motor vehicle for normally opening said feed to the engine and adapted to establish communication of the atmosphere with said feed when the latter is shut off by said valve, means automatically operating said valve for actuating the same from normal feeding position, means operated by an accelerator, clutch and a medium of a transmission for regulating said first means, means coacting with said valve for controlling the ignition of the engine, a tension element connected to said valve for urging the latter into feeding position, opening and closing valves included in said second-named means, and a housing included in said feed and having the first valve slidable therein, said housing having a vent to the atmosphere, said first valve having a chamber for coaction with the vent to communicate the feed to the atmosphere.

7. In combination with an internal combustion engine of a motor vehicle having a fuel intake manifold and a carbureter connected thereto and an accelerator for said carbureter and a clutch pedal and transmission of the motor vehicle, a valve located in the intake manifold and normally admitting fuel from the carbureter to said intake manifold and adapted to communicate the latter with the atmosphere when positioned to close the intake manifold to said carbureter, means acting to position said valve to connect the carbureter to the intake manifold, and means for moving said valve into a position to close the carbureter to the intake manifold connected to the accelerator, clutch pedal and transmission.

8. In combination with an internal combustion engine of a motor vehicle having a fuel intake manifold and a carbureter connected thereto and an accelerator for said carbureter, and a clutch pedal and transmission of the motor vehicle, a valve located in the intake manifold and normally admitting fuel from the carbureter to said manifold and adapted to communicate the latter with the atmosphere when positioned to close said intake manifold to the carbureter, said valve having a suction chamber for effecting operation of the valve, a pipe connecting the suction chamber to the intake manifold, opening and closing valves in said pipe, and means connecting said opening and closing valves to the accelerator, clutch pedal and transmission for the actuation of the latter-named valves to control the suction from the manifold to the suction chamber, and means acting to position said first valve to connect the carbureter to the intake manifold.

9. In combination with an internal combustion engine of a motor vehicle having a fuel intake manifold and a carbureter connnected thereto, and an accelerator for said carbureter and a clutch and transmission of the motor vehicle, a valve located in the intake manifold and normally admitting fuel from the carbureter to said intake manifold and adapted to communicate the latter with the atmosphere when in a position to close the intake manifold to the carbureter, spring means for actuating the valve to establish communication between the carbureter and the intake manifold, electrical means for operating the valve to shut the carbureter to the intake manifold and communicate the latter to the atmosphere and including an electric circuit and electrical source, switches located in said circuit and operatively connected to said accelerator, clutch pedal and transmission whereby said circuit may be opened and closed by the actuation of the accelerator, clutch pedal and transmission.

LEE ALBERT SUMMERS.